Oct. 17, 1939.   C. W. KELSEY   2,176,261
AGRICULTURAL IMPLEMENT
Filed April 23, 1937   2 Sheets-Sheet 2
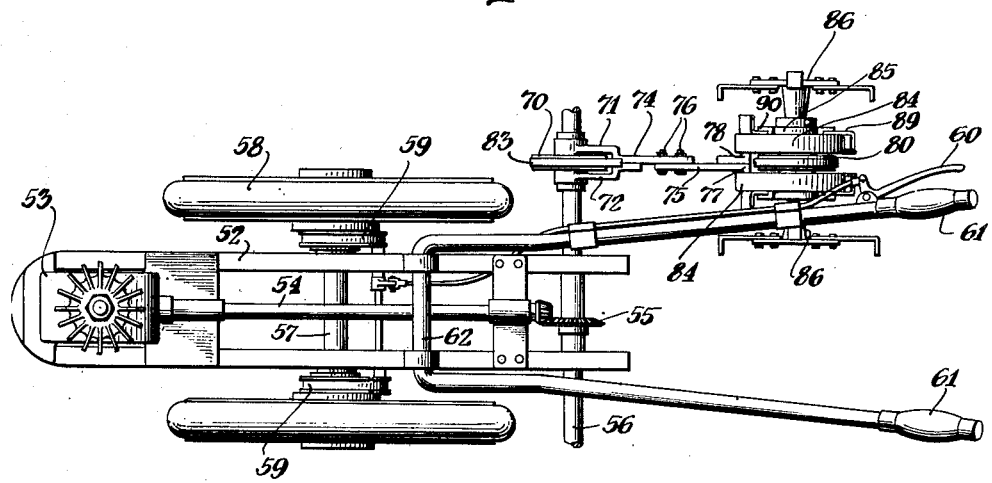
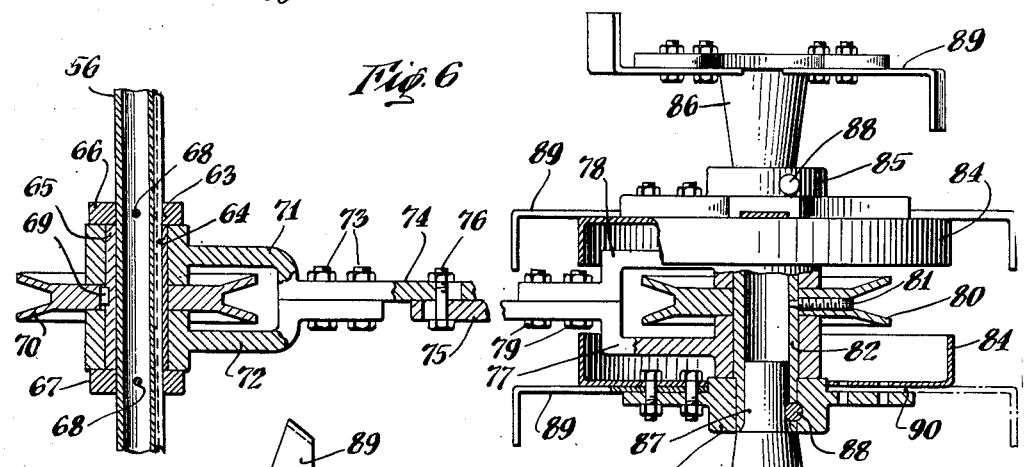
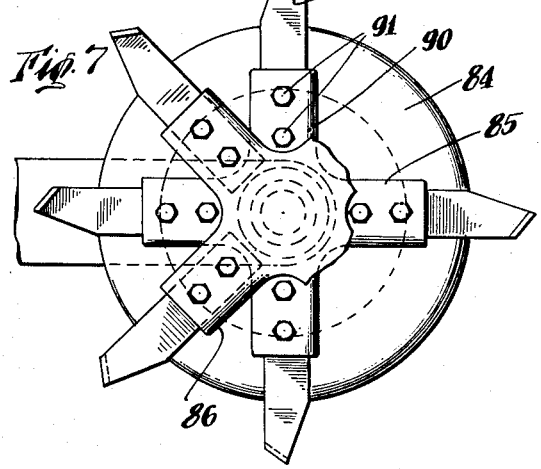
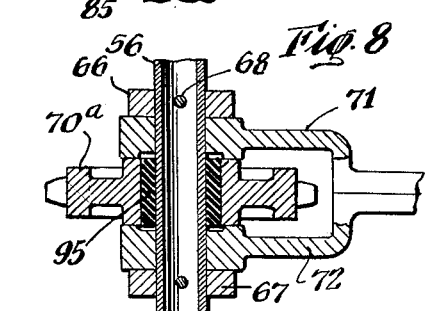
INVENTOR
Cadwallader Washburn Kelsey
BY
ATTORNEYS Patented Oct. 17, 1939

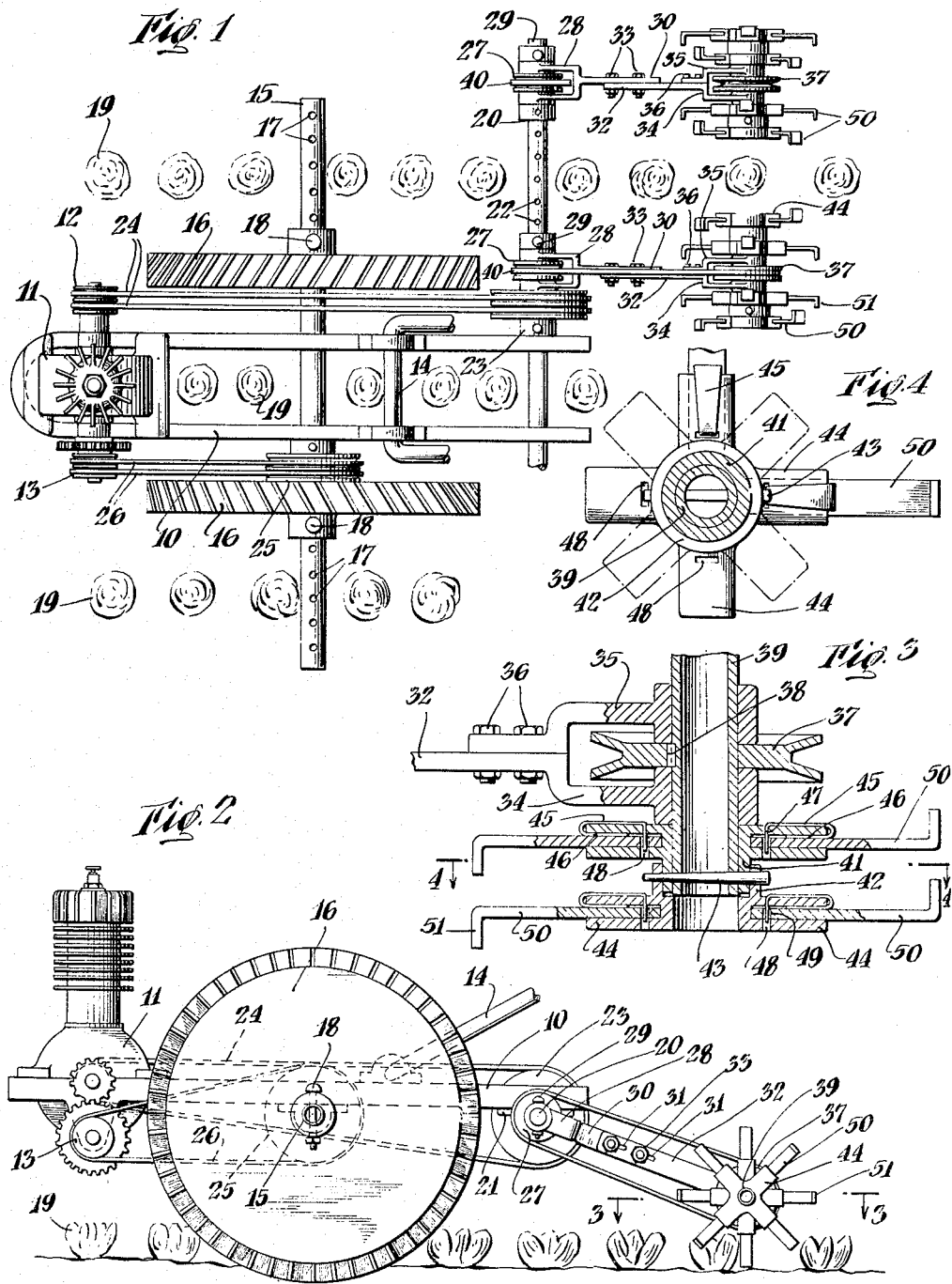

2,176,261

UNITED STATES PATENT OFFICE 2,176,261

AGRICULTURAL IMPLEMENT

Cadwallader Washburn Kelsey, Short Hills, N. J.

Application April 23, 1937, Serial No. 138,488

2 Claims. (Cl. 97—40)

This invention relates to an improvement in agricultural tilling devices, as well as in tools and in tool mountings in association therewith.

In devices heretofore utilized for tillage using revolving tools, it has been impossible to readily cultivate or till two rows of vegetation that vary from predetermined spacing. In other words, a machine that would straddle an existing row of plants to cultivate the two intervening rows, for example, of one type of plant that is spaced in three foot rows, could not readily be adjusted to span and cultivate another type of plant which was spaced in two or four foot rows.

It is an object of the invention to provide a machine of this character that readily adapts itself to varying conditions encountered during normal usage and that is easily adjusted to take care of varying plant row widths that are encountered.

Another object is that of providing a machine equipped with a flexible drive which will yield under strain, thus saving the parts from undue shock and wear.

A further object is that of providing tool mountings for use in connection with a tilling machine which are adjustable for use in connection with various types of cultivating and tillage work, so that the width of the strips cultivated and the spacing of the strips with respect to one another may be varied to a considerable degree.

Still another object is that of providing a machine of this nature that is relatively rugged and simple in construction, and which is capable of operation by unskilled labor over long periods of time with freedom from all difficulties.

With these and other objects in mind, reference is had to the attached sheets of drawings, in which:

Fig. 1 is a plan view of a tilling machine embodying one form of the invention, and showing the tilling or cultivating tool mountings in part;

Fig. 2 is a side elevation of the machine shown in Fig. 1;

Fig. 3 is a fragmentary cross-section of the tool mounting and driving means as taken through the lines 3—3 of Fig. 2;

Fig. 4 is a cross-section of the tool mount shown in the preceding views and taken through the lines 4—4 of Fig. 3;

In Fig. 5 there is shown a plan view of a tilling or cultivating machine embodying a slightly different modification of the invention;

Fig. 6 is an enlarged fragmentary plan view, partially in cross-section of the tool mounting means associated with said machine;

Fig. 7 is a fragmentary side elevation of said mounting means disclosing further details thereof; and Fig. 8 represents a modified type of tilling shaft.

Referring now primarily to Figs. 1 through 4, there is shown a tilling machine having a frame or chassis 10, upon which is mounted a motor 11, which may be of the internal combustion, or any other suitable type. This motor may be provided, for example, with drive wheels 12 and 13, either directly or through gears coupled to the crank shaft of the engine, and for a purpose hereinafter brought out.

Associated with the chassis may likewise be any suitable handles or other guiding device, a fragmentary showing of which appears at 14. The chassis and motor may be mounted on an elongated axle or shaft 15, which supports wheels 16. It will be noted that the axle is provided with a plurality of holes 17 adjacent either end thereof, and the wheels are coupled to said axle by means of bolts 18 which are adapted to pass through any of the holes 17, so that an adjustment as to the spacing of said wheels may readily be effected. This is important when plants or crops planted in rows of varied widths are to be successfully cultivated. One such spacing of plant rows is indicated schematically at 19, but it will be appreciated that, according to well known practice, crops of different characteristics are planted in rows which vary in their spacing, one from the other. By adjusting one or both of the wheels 16 along the shaft 15, a proper spacing can be provided so that the machine successfully straddles one or more crop rows.

Also mounted on said chassis, preferably to the rear of the wheels 16, is a power shaft 20, which may be supported by the chassis at 21 by means of any suitable mounting. The power shaft is likewise provided adjacent either end with a series of holes 22 drilled transversely through the same. It will be appreciated that in the showing of Figure 1, only one portion of the power shaft is represented, the other portion being a duplicate of that illustrated.

Secured to the shaft, in any desired manner, is a drive wheel 23, which is provided with a plurality of belt receiving surfaces which are preferably of the V-drive type. The drive wheel 12, associated with the motor, is likewise preferably of the V-drive type, and provided with a plurality of belt receiving surfaces. Connecting the two drive wheels are a plurality of belts 24, it being understood that while two belts have been shown, any number from one upward might be resorted to, depending upon the amount of work to be done and the load conditions encountered. These belts are likewise preferably of the V-drive type for complementary cooperation with the belt surfaces of the drive wheels.

If desired, the shaft or axle 15 may likewise be provided with a drive wheel 25, having a plurality of V-belt surfaces thereon. This drive wheel may cooperate for example, with the drive wheel 13, also secured to the motor, and which, as has been shown, is preferably provided with a plurality of V-belt surfaces. Coupling both of said wheels are V-drive belts 26, which, as has heretofore been described, may be of any desired number, in accordance with the load conditions experienced. In addition, the drive wheel 13 may, through the use of a transmission or clutch, be caused to drive the shaft 15 independent of the rotation of the shaft 20 by the drive wheel 12, or at any different speed of rotation from the latter.

Coupled to the power shaft 20, at spaced intervals, are a plurality of pulley wheels 27, each of which is positioned on said shaft, for example, by means of a key cooperating with a keyway formed longitudinally of said shaft as well as in the hub of said pulley wheels (not shown). Of course, any other suitable means of connection might be resorted to. Straddling each of said pulley wheels is a U-shaped member 28, which is held in position by means of collar portions 28a and 28b and pins or bolts 29 cooperating therewith and with the desired holes 22 in the shaft 20.

The members 28 are preferably formed with an extending arm 30, provided with slot openings 31. These cooperate with similar openings in the arm 32, and the two members are adjustably held by means of bolts 33. The arm 32 extends to form one side 34 of an additional pulley retaining member, the other side of which has been shown at 35, the two being held together by means of the bolts 36. The pulley wheel 37, positioned therebetween, is keyed at 38 to a tool mounting shaft 39, which, as has been shown, is preferably hollow in construction. As has been illustrated the pulley wheels 27 and 37 are both preferably of the V-drive type heretofore described, and a V-drive belt is utilized to transmit power from the shaft 20 to the shaft 39 through said pulleys.

Secured to the tool mounting shaft 39 are a plurality of tool holders, the innermost of which, as has been shown at 41, is provided with a closefitting sleeve for cooperation with the outer surface of said shaft. A further tool holder may be utilized in cooperation therewith, and is provided with a sleeve 42 of an internal diameter slightly greater than the outer diameter of the sleeve 41, and adapted to fit thereover, as has been shown particularly in Figure 3.

A pin 43 cooperates with openings in the slots 41 and 42, as well as with shaft 49, to lock the parts together, said pin being preferably of the taper type for ready disengagement. Each of the tool holders in the preferred embodiment is provided with four positioning tool sockets 44, preferably located at right angles to each other and being so positioned on adjacent tool mounts so as to assume the intermediate positions with respect to one another shown in Figure 2, so that not more than one tool is in contact with the ground at any given time, and so that each of the tools is preferably evenly spaced with respect to the next one in position.

Associated with said tool receiving sockets are strip spring members 45, or other suitable tool retaining means. Said members are provided with a portion 46, which extends into said tool socket from the top thereof for a distance sufficient to serve to retain the member in place. Likewise, the lower end of the spring 45, at 47, is bent at right angles and extends inwardly through said tool mounting with an opening 48 provided therein, and passes through a similar opening 49 in the tool 50, thus holding the latter against accidental withdrawal from the tool mounting socket.

It is likewise to be noted that, in practice, the tools 50 are preferably provided with ground engaging portions 51, at right angles to the main body of the tool, and that said tools can be inserted so that they will have opposed ground engaging portions extending in different directions.

In the embodiment shown in Figures 5 through 7, a tilling machine is shown as provided with a chassis 52, upon which is mounted a motor 53 of any suitable type. Coupled to said motor is a drive shaft 54 which terminates in a transmission or drive 55, which may be suitably housed in any well known manner, and which, in turn, is coupled directly to a power shaft 56. The chassis may, in turn, be mounted on an axle 57, to which are coupled, for example, pneumatic tired wheels 58. Likewise associated with said wheels may be braking means 59, of any desirable type, and which can, for example, be actuated by means of a cable-acuated control 60 secured to handle or guiding means 61. These guiding means are mounted on the chassis, for example, at 62, and serve to steer or guide the machine when in operation.

It will, of course, be apparent that the power shaft 56 may be secured to the chassis by any well known expedient, and which is preferably provided along a major portion of its length with a keyway 63, cooperating with which is a key 64, which likewise engages, for example, a stub sleeve 65, which is positioned along said shaft by means of collars 66 and 67, these latter being secured in place by means of pins passed through openings 68 which are located at frequent intervals along the length of said shaft. By removing the pins 68 the entire structure may be shifted transversely to any desired position, so that the proper location of the parts results.

The sleeve 65 may be provided with a further keyway on its surface, cooperating with a key 69, which likewise is accommodated in an internal keyway provided in the pulley wheel 70. This pulley wheel is preferably of the heretofore described V-drive type and is accommodated by a split U-socket assembly 71 and 72, which are joined together at 73 by a pair of bolts, or other suitable expedient.

An extension arm 74, as has been heretofore described in connection with the preceding structure, couples said assembly to a complementary arm 75 by means of bolts 76 accommodated in elongated slots formed in both of said arms, this assembly providing for an adjustment of the overall length of the members. A split U-socket 77 and 78, joined, for example, by bolts 79, forms the other end of the complementary arm 75, and accommodates between its parts a pulley wheel 80, which is, in turn, secured, for example, by means of a set-screw 81, to a stub shaft 82. This wheel is also preferably of the V-drive type, and is joined to the wheel 70, for example, by means of a V-belt 83. Guard members 84 may be positioned to either side of the pulley 80 to protect the same from injury or clogging, due to the presence of dirt or other material during the tilling operation.

In this embodiment, a tool holder 85 is provided adjacent either side of the drum members 84 which serve as depth control guides for governing the extent to which the cultivating or tilling tools enter the soil. It is, of course, common experience that certain types of plants require cultivation or tillage to a greater or lesser depth, and by the simple expedient of the drum members a positive control is had over the tillage performed by the machine. The depth can be varied either by changing the diameter of the drums that are used or by adjusting the tools themselves so that they are longer or shorter. The tool holder is, in turn, formed with a hub which passes over the hollow shaft 82. In addition, a second tool mounting member 86 may be utilized, and which is formed with a tapered plug member at its end, as shown at 87. This member cooperates with the internal surface of the shaft 82, and both tool mounts are held in position with relation to the shaft 82 by means of, for example, an eccentrically disposed pin 88.

In the tool mounts, as heretofore illustrated, the tool sockets are again positioned at right angles to one another, there being four on each of said tool mounts. Likewise, as has been heretofore described, the adjacent tool mounts are so positioned on the shaft 82, so that, as has been shown in Fig. 7, the tools on one mount are each located about said shaft at a forty-five degree spacing from the tools of the adjacent tool mount. This prevents more than one tool on adjacent tool mounts from entering the ground at any given time. In this embodiment, the tools 89 have been secured in position on the tool sockets 90, by means of the bolts 91.

In Fig. 8 there is shown a tilling shaft of the same general type disclosed in Fig. 6, with the exception that a sprocket wheel 70a has been substituted for the conventional pulley wheel. This sprocket wheel is secured to the shaft 56 by means of a rubber insert 95, which preferably is in the form of a ring and is vulcanized on its inner surface to the shaft and on its outer surface to the sprocket wheel. This expedient provides a resilient coupling between the two members which absorbs certain shocks and stresses to which the mechanism would otherwise be subjected. In this type of structure, a chain drive would be substituted for the normal V-belt drive, and in each instance where a sprocket wheel is employed throughout the mechanism, the method of mounting the same to its shaft by means of a vulcanized rubber insert might be resorted to.

Turning once again to Figs. 1 through 4, we find, in operation, that the motor 11 transmits, as may be desired, both driving power to the wheels 16 and through power shaft 20 to the tools 50. In each instance, this power is preferably delivered by means of the V-drive belts 26 and 24, respectively. In the latter instance, secondary V-drive belts transmit power from the power shaft 20 to the tools themselves.

If, during operation, one of the tools encounters an obstacle in the ground, the strain and shock will be greatly relieved through the resiliency of the belt-drive, and an obstacle encountered by one tilling or cultivating unit will not affect the efficient operation of the remainder.

It has been found that the V-belt drive enables the machine to take full advantage of the resiliency and flexibility of the belt drive without sacrificing in the slightest the efficiency of power transmission. In the development of tillage machines of this type in the past, considerable difficulty has been encountered due to breakage of the tilling tools both from impact with rocks and other foreign matter in the soil and likewise through rebound when suddenly released from exerting pressure against an obstruction. In an attempt to overcome this difficulty, resort has been made to shock absorbing devices both of rubber and resilient metal, to absorb in so far as possible the shock of both impact and recoil. While these devices have resulted in a vast improvement in the performance of the machines, and have greatly increased the life of the tilling tool, still the present invention, through the utilization of a positive yet resilient drive, has made further important strides looking toward the eradication of this form of difficulty.

As has been heretofore described, the wheels 16 may be spaced at any desired distance from one another, to take advantage of different widths in crop rows; and, by the same token, the separate tillage units can be moved along the power shaft 20 by simply removing the pins 29 and sliding each assembly sidewise to the desired position, and then replacing the pins 29 and keying the members in position.

Should the width of the path tilled or cultivated by each unit be too great, various flexible adjustment of said width can be effected by first removing all outwardly turned tools from the outer tool mount 42, thus reducing the width of the path cultivated to an extent equal to the width of the end portions 51 on the end portions of the tools thus removed. Should a further reduction be desired, the tool mount 42 may be completely removed by first knocking out the pin 43 and thereafter replacing said pin so as to lock the tool mount 41 alone on said shaft. An even further reduction in the width of the cultivated path can be effected by removing the outwardly extending tools in the inner tool mount 41, the removal of the tools in each instance being effected simply by lifting up on the flat springs 25, so as to withdraw the inwardly extending portion 47 to a point beyond the opening 49 in the tools, and then withdrawing the latter.

It is, of course, apparent that, instead of withdrawing the outwardly extending tools in each of the instances thus related, the same can be reversed in position so as to be inwardly extended.

In the structures shown in Figs. 5 through 7, it will be noted that the tilling tools themselves, through their forward motion, assist in the propulsion of the machine, and by utilizing the brake, if provided, ready control of the machine during tilling or cultivating is accomplished. The structure shown in these figures is susceptible to the same method of operation as has been shown and described in connection with Figs. 1 through 3, except that in this instance the adjustments and changes should be made with due consideration of the assembly of the parts as heretofore described.

Should it be so desired, any of the tilling devices disclosed herein can be operated with a motion that is the reverse of the forward motion heretofore described. In such cases the impact of the blow struck by the tilling tool as it contacts the ground will be materially increased, thus making the necessity of a resilient drive mechanism all the more apparent. This increase in the force of impact has certain results which in some instances are desirable, as, for example, the tendency to more finely pulverize the soil. The machine, when utilized with a reverse motion of the tilling tools, must, of necessity, have either a positive forward drive for the carrying wheels, or be of small enough size to be easily handled by an operator against the tendency that the tilling tools would have to propel the machine in a rearward direction.

It likewise should be noted that the guiding handles of any of the machines illustrated can be so arranged as to be capable of being tilted in a forward rather than in a rearward position, so that if desired the entire apparatus can be pushed or guided in its rearward travel. This is especially desirable in instances where cultivation is being carreid on in relatively close and confined quarters, as it provides a better view of the plant rows to the operator and enables him to avoid damaging the crop that is being cultivated.

It will, of course, be appreciated that many rearrangements of the parts, and changes in design and construction, might be resorted to without in the least departing from the spirit of the invention as heretofore described.

Having thus described my invention, I claim:

1. A rotary tilling machine including a chassis, a source of power mounted by said chassis, an auxiliary shaft also mounted by said chassis, resilient means for coupling said source of power to said auxiliary shaft, a plurality of tilling shafts arranged transversely of said machine and in axial alignment with each other, means for supporting said tilling shafts for independent rotation with respect to one another, tilling tools carried by said tilling shaft, and resilient means independently coupling each of said tilling shafts to said auxiliary shaft for rotation therewith.

2. A rotary tilling machine including a chassis, a source of power mounted by said chassis, drive wheels associated therewith, an auxiliary shaft likewise carried by said chassis, resilient means for coupling said source of power to said auxiliary shaft, further resilient means for connecting said source of power to said drive wheel, a plurality of tilling shafts, means for supporting said tilling shafts in axial alignment transversely of said tilling machine, said supporting means permitting of independent elevation or lowering of said tilling shafts out of axial alignment with each other, and further means for resiliently coupling each of said tilling shafts to said auxiliary shaft for independent rotation of the former with the latter.

CADWALLADER W. KELSEY.